(12) United States Patent
Lewis, Jr. et al.

(10) Patent No.: US 8,360,587 B2
(45) Date of Patent: Jan. 29, 2013

(54) REFLECTIVE CAMOUFLAGE AND METHODS

(76) Inventors: Roger Lewis, Jr., Hughes Springs, TX (US); Roger Lewis, Sr., Hughes Springs, TX (US)

( * ) Notice: Subject to any disclaimer, the term of this patent is extended or adjusted under 35 U.S.C. 154(b) by 224 days.

(21) Appl. No.: 12/723,340

(22) Filed: Mar. 12, 2010

(65) Prior Publication Data

US 2010/0232029 A1    Sep. 16, 2010

Related U.S. Application Data

(60) Provisional application No. 61/159,687, filed on Mar. 12, 2009.

(51) Int. Cl.
*G02B 7/02* (2006.01)
(52) U.S. Cl. ............................. 359/871; 43/1
(58) Field of Classification Search .............. 359/871; 43/1, 2
See application file for complete search history.

(56) References Cited

U.S. PATENT DOCUMENTS

| 5,592,960 A | 1/1997 | Williams |
| 7,311,962 B2 | 12/2007 | Fink et al. |
| 7,493,910 B1 * | 2/2009 | Ransom ................. 135/117 |
| 2007/0006909 A1 * | 1/2007 | Lewis ..................... 135/115 |

* cited by examiner

*Primary Examiner* — Joseph P Martinez
(74) *Attorney, Agent, or Firm* — Slater & Matsil, L.L.P.

(57) ABSTRACT

Methods and system for providing concealing camouflage of a position, hunter or observer using a shield or enclosure with a reflective exterior having exterior sides inclined towards the horizontal and observation portions of two-way mirror material. The shield or enclosures may be of any shape and may be of rigid sides permanently affixed to a frame, or be provided as collapsible or pop-up enclosures using temporary attachments and frames or poles. The enclosures may be entirely of two-way material. The reflective material may be mirror glass, any clear material treated on one surface with mirror coatings, or metalized cloth or film, including metalized polyester. A roof may be provided as non-reflective or reflective and may be flat or dome shaped. Two-way mirrored observation ports that open and close may be provided in any shape or position. The enclosure may conceal a boat, raft, or vehicle.

20 Claims, 13 Drawing Sheets

REFLECTIVE CAMOUFLAGE AND METHODS

This application claims the benefit of U.S. Provisional Application No. 61/159,687, entitled "Reflective Camouflage and Methods," filed on Mar. 12, 2009, which is incorporated herein by reference.

TECHNICAL FIELD

The present invention relates generally to an apparatus and methods for camouflaging an enclosure. The enclosure or other position is camouflaged using a reflective surface on the exterior. More particularly, the present invention relates to methods and an apparatus for providing camouflage by providing an enclosure with a reflective outer surface positioned so as to provide a reflected image of the foreground to any observer, while providing the enclosure with reflective covered two-way mirrored observation ports or shooting ports for an observer or for a mechanism such as a sensor or camera. The observer or mechanism is effectively hidden from view by the reflective camouflage.

BACKGROUND

Generally, camouflage of an observer position is achieved by providing a hunting blind, stand, raft or other location that is colored or painted in a manner to blend it into the background environment. For example, camouflage paint, "camo" netting, or permanent or temporary patterned coverings are used on materials that are then applied to the exterior of permanent or portable deer blinds, jeeps, boats, duck blinds, tree stands and other observer or hunter positions. These camouflaged positions may provide permanent, mobile or portable shooting positions or game observation posts. Some example applications for the camouflaged objects are, without limitation, typically to provide a hunting position, for example, a deer blind, duck blind or the like. In some applications, a game observation position is provided, for example, to do wildlife research without revealing the presence of a human observer or camera equipment to the animals. Other applications may include enclosures for security or surveillance applications in parking lots, office buildings, apartments complexes or the like where observers or equipment may also be concealed from view by the use of such camouflage enclosures.

A problem with the prior art patterned type of camouflage is that the covering may not match the foreground or background, thus the camouflage may be ineffective to conceal the position or observer. For example, a particular pattern or shade chosen for one season or for one location may not be effective in another season or another location. As one simple example, a deer blind painted with a fall camouflage pattern will be more visible than an unpainted structure in winter; as the background is now potentially white with snow. Thus, the blind is rendered ineffective when conditions change or when moved to another location.

Reflective material has been applied to hunting enclosures. For example, U.S. Pat. No. 5,592,960 discloses a portable, rectangular enclosure with reflective outer surfaces. However, the reflective surfaces are provided in vertical orientation (parallel to a vertical plane, or perpendicular to the horizontal ground or floor surface). The inventors of the present application have previously determined that material oriented in this direction fails to provide effective concealment. Game or other observers may see their own reflection in the vertical reflective surfaces, or celestial reflections such as the sun, sky or moon that reveals the structure against the background. Although the structure will reflect to some extent the natural surroundings and thus be a match to the environment in different seasons or locations, the flaws make the camouflage less effective than desired.

In FIG. 1, an enclosure 10 of the type such as described in the patent referenced above is shown configured for a deer blind application. Although for simplicity, only the exterior front surface is drawn as a reflective surface, typically all four sides are described in the prior art as reflective. The drawback of the vertical sides of this prior art enclosure is that the game or other observer, when looking directly at the enclosure, may see its own reflection, or the sky behind it, or celestial objects such as the sun or moon may be reflected, thereby revealing the presence of the enclosure to the viewer or game. A second problem is that the observation ports themselves provide ample areas where the interior of the enclosure, or the observer or hunter, may be observed by the game, thus any concealment provided by the reflective camouflage is rendered ineffective.

In a prior patent application U.S. Publ. No. 2007/0006909 A1, reflective camouflage was disclosed. In this prior application, which is hereby incorporated by reference herein in its entirety, an enclosure such as a deer or duck blind is provided with a reflective outer surface that inclines towards the horizontal so that the exterior sides are not vertical. FIG. 2 depicts the enclosure 21 with an observation port 22. The improvements were accomplished by tilting the exterior surface outwardly at the top, that is, the exterior surfaces are no longer parallel to the vertical, or perpendicular to the horizontal ground or floor. Instead, as seen in FIG. 2, the exterior reflective surfaces are inclined outwardly at the top. The angle of the exterior surfaces is less than 90 degrees from horizontal. By providing this tilted or outwardly inclined surface, the structure reflects to an onlooking observer, such as game or fowl in the area, a reflection of the material in the foreground of the enclosure. The observer approaching the structure will not see its own reflection, due to the inclined surfaces; instead, that reflection is directed downward and away from the observer. Similarly, the observer will not see the sky, the sun or moon or other inappropriate reflections. In this manner, the enclosure remains concealed and camouflaged.

However, in order to provide both observability and gun ports and bow ports out of the enclosure for use by the hunter or other observer, ports or openings, such as 22 of FIG. 2, were provided. These ports or openings may be visible to the game or another onlooker or observer looking at the outside of the enclosure. Thus, this reflective camouflage provides less effective concealment than needed for successful observation of wild animals or fowl, or to conceal the existence of the enclosure from an outside observer. A continuing need thus exists for additional improvements in reflective camouflage for structures or positions that overcome the problems of the prior art.

SUMMARY OF THE INVENTION

These and other problems are generally solved or circumvented, and technical advantages are generally achieved, by preferred embodiments of the present invention which provide an apparatus and methods for forming a visually reflective camouflage on the exterior of a structure with an inclined or tilted exterior surface, providing at least one, or many, two-way mirrored observation portions in one or more sides of the structure. By concealing the observation points and gun or bow ports with a two-way mirrored surface, the structure is much more effectively concealed from game or an external observer, and the presence of a hunter or observer is also concealed. The use of the tilted exterior surface with the visually concealed observation ports or gun ports enables the device to effectively provide camouflage or concealment in any environment including snow, leaves, grass, water, a parking lot, tarmac, concrete, or in surveillance applications, even an interior environment.

In another alternative embodiment, an enclosure is provided that is entirely covered in a two-way reflective material. An observer within the enclosure is therefore concealed by the enclosure. The sides of the enclosure are inclined away from the vertical and towards the horizontal so that an onlooker sees the reflection of the foreground around the enclosure, and does not see its own reflection, thereby effectively concealing an observer or equipment inside the enclosure.

The embodiments above provide enclosures. These may be of any shape, including oval, rectangular, square, circular, triangular, octagonal, or any other shape so long as the surfaces incline away from vertical and towards the horizontal. The surfaces may be entirely of two-way material; alternatively, the surfaces may be of reflective material with ports of two-way material. The enclosures typically have a roof which may be fixed or moveable and may slide, fold, be a rolling blind or shutter material, and may be opened from within using rollers, pulls, slides, and the like. The enclosures may be of rigid clear material with a mirrored back, such as polycarbonate, Plexiglas®, plastic, acrylic, mirror glass, may be of any thickness, and may be bulletproof for certain applications. Alternatively, the exterior may be a flexible cloth, film, or sheet material coated to be reflective or to be a two-way mirror surface.

Additional embodiments are provided for a temporary, easily portable camouflage system. A reflective coating is provided on a fabric, paper, foil or other flexible material. A temporary, portable frame, such as a pop-up tent frame of flexible wire, fiberglass shock cord frame, nesting legs and scissor top frame, umbrella type frame or other collapsible, foldable or rollable frame is erected. The reflective exterior is then added such that the sides of the temporary enclosure form sides inclined outwardly from the center. Observation ports, gun ports, camera ports or bow ports are provided using two-way reflective materials so that the observer inside the enclosure may observe game or other surroundings, while remaining totally concealed from an onlooker or game looking at the enclosure.

A portable shield having a frame or lightweight panel embodiment is provided. The panel or frame is again covered with mirrored or reflective material, and at least a portion, or alternatively the entire shield, is provided as a two-way reflective material. The material may be a cloth, foil or sheet of material that is temporarily mounted on the frame when the frame is in use, or a permanent material comprised of one or more panels. In some embodiments, the shield may roll or fold, and be stored in a carrier with straps and a protective cover. The shield may include legs or supports to ensure that when in use facing game or another observer, the shield is maintained at the proper inclination to prevent reflections from the sun or the onlooker's point of view from revealing the presence of the shield. A hunter or observer may easily sit, stand or lie behind the shield and remain concealed.

Because the observer is inside an enclosure or behind a shield that is covered with a material that is completely reflective and the material is inclined at an angle, the enclosure or shield of the present invention provides very effective concealment of a hunter, an observer, or a piece of equipment such as a camera or video system for observation. Unlike the prior art hunting blinds, the present invention provides complete concealment of the observer as well as the advantage of perfectly matching camouflage by reflecting the environment exactly, unlike painted camouflage or netting which is at best a simulation of an expected environment.

Embodiments of the present invention improve the ability of hunters, game observers, photographers, bird watchers, animal behaviorists, security officers, policemen and others to remain effectively concealed in an enclosure or behind a shield, even when an onlooker directly looks at the observer. As a result, the ability to get close to, and stay close to wild game, fowl, or even other people without the game, fowl or other people being aware of the concealed observer offers many advantages in a variety of applications, and even while examples such as a deer blinds or duck blinds are provided here as examples, the invention is not so limited and the appended claims cover a variety of alternative embodiments and applications.

BRIEF DESCRIPTION OF THE DRAWINGS

For a more complete understanding of the present invention, and the advantages thereof, reference is now made to the following descriptions taken in conjunction with the accompanying drawing, in which.

The figures are illustrative, and are not to scale, and some features may be omitted for clarity. Like reference numerals for like elements are used.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The exemplary embodiments of the present invention will be described with respect to preferred embodiments in a specific context, namely the use of an inclined, mirrored or reflective surface on an exterior of an enclosure to provide reflective camouflage or concealment in conjunction with the use of one or more two-way mirror observation ports. An onlooker viewing the surface is therefore presented with an uninterrupted reflection of the foreground in front of or surrounding the structure. In some embodiments, the structure has four sides, or is a column that is oval, circular, or is rectangular, octagonal, triangular or square shaped generally, with side surfaces that are inclined away from the center of the structure. In other embodiments, the structure is provided as a shield that is reflective, includes one or more two-way mirrored observation portions or ports, or is entirely of two-way material. When in use, the shield is configured to be inclined away from a vertical orientation and towards the onlooker or game being viewed, to provide the onlooker an uninterrupted reflection of the foreground in front of the shield.

Figure 1:
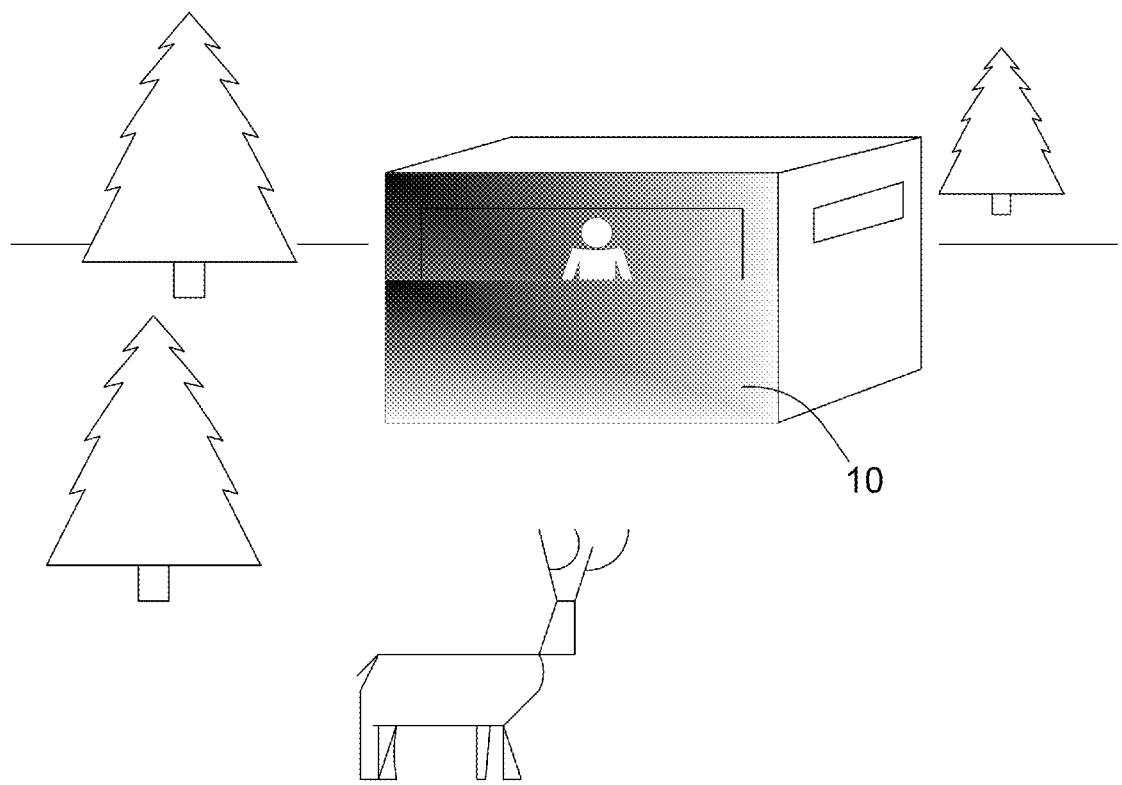
FIG. 1 is a diagram illustrating a hunting blind of the prior art.
Figure 2:
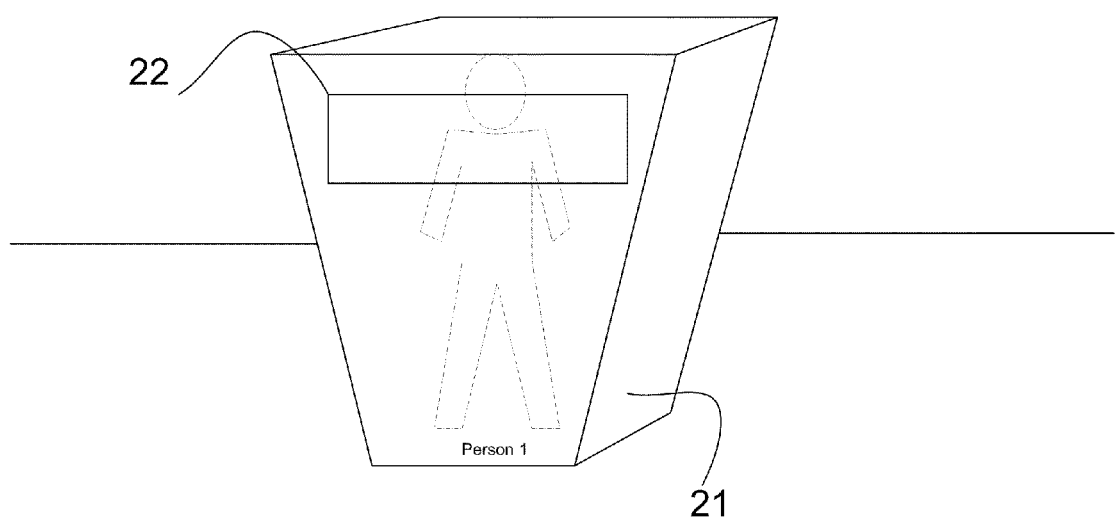
FIG. 2 is another diagram illustrating an alternative prior art hunting blind.
Figure 3:
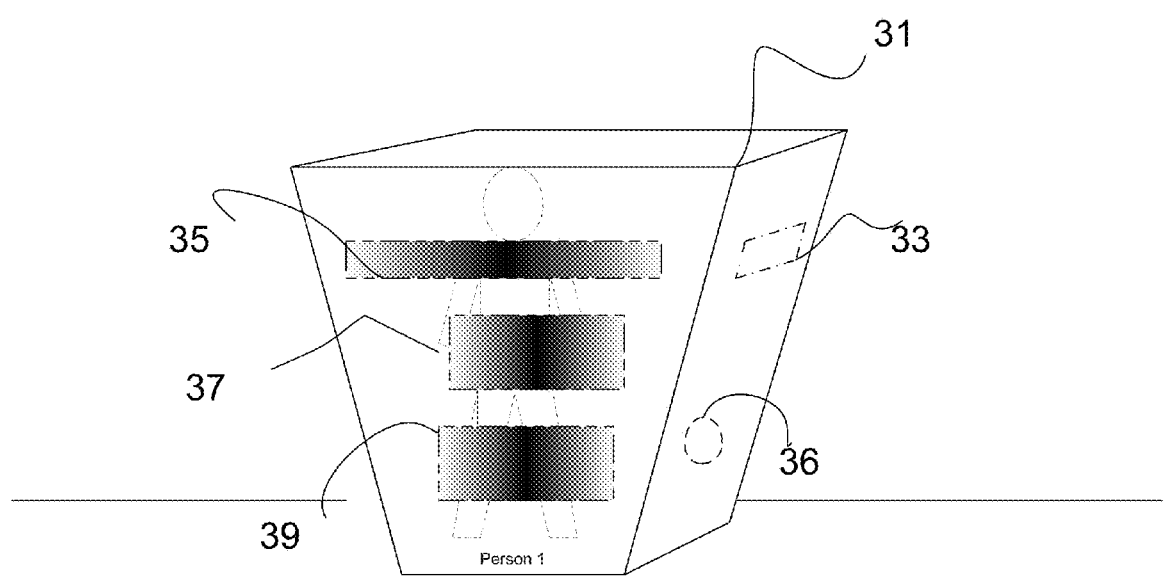
FIG. 3 is a diagram illustrating a first embodiment of the present invention.

FIG. 3 depicts a first exemplary embodiment. FIG. 3 depicts an enclosure 31 which may be of various sizes. Typically, the enclosure will be of a sufficient height to conceal a person standing within, and of sufficient volume to enable comfortable use of a gun, camera, or other equipment, and may be larger for multiple observers, for example. Smaller, lighter enclosures for prone or sitting positions may be fabricated as well. The embodiment 31 of FIG. 3 is a four sided deer or duck blind embodiment that may be used, for non limiting examples, to hunt game such as deer, wild pigs, coyotes, elk, moose etc., or birds, including waterfowl, or to observe game, photograph, perform research on animal behaviors and the like. Hunting may be performed with a ballistic weapon including a rifle, a bow, pistol, cross bow or the like. The use of four sides is but one example; ovals, circles, and three sided, octagonal, and other shapes are also contemplated as further described below.

The enclosure 31 has reflective or mirror material covering the exterior. The observation ports 35, 37, 39, 33 and 36 are each formed of a two-way mirror surface. As known in the art, a two-way mirror surface has the attribute that it reflects most of the light that is incident upon it but passes some light through to the other side. That characteristic gives the embodiment a key advantage in concealment as it means a hunter or observer located within the enclosure 31 may look through ports 35, 37, 39, 33 and 36 to freely observe the game, such as deer or other game, while remaining completely concealed by a reflection to the onlooker provided by the two-way mirror surface. Various positions of the ports are shown as alternatives and more or fewer observation ports may be added without limiting the scope of the invention. Various positions for shooting standing up, on a stool or support, lying prone or sitting may be provided. Bow hunting embodiments may include shooting ports shaped as a "T" or shaped as an "X" or a rectangle that is vertically oriented along its length and located on one or more sides.

Enclosure 31 may be taller than a typical person, big enough for multiple observers, or made smaller for portability. In some embodiments, less than all of the sides may be reflective. In some embodiments, the entire reflective coating may be of the two-way material. The invention may be varied in many ways so long as the sides are reflective. Any observation ports are also reflective by being formed of two-way material, and the exterior surface is inclined towards the horizontal or outward from the center. When the entire structure is of two-way material, no observation ports are needed, but shooting ports which may be opened by the observer for use are provided.

The reflective sides may be formed in many ways. A Plexiglas®, plastic, polycarbonate, acrylic or other clear polymer with a mirrored rear surface may be used and may be of a variety of thicknesses, for example, 1/64th inches to 5 inches or more, with 1/8 inches being used in a typical embodiment for a hunting blind. The two-way mirror portions, which may only cover the observation/shooting ports, or which may cover the entire structure, may be made of similar materials; however, formed with only partial reflectivity. The sides of the entire enclosure may be thicker, up to even 5 inches thick. The enclosure may be formed entirely or partially of bulletproof mirror material. U.S. Pat. No. 7,311,962, entitled "Method of forming Dielectric Mirrors", to Fink, issued Dec. 25, 2007, which is hereby incorporated by reference in its entirety, describes a suitable reflective or mirror material composed of a chalcogenide glass and a thermoplastic polymer.

Since only the observation ports need to be two-way mirrors, the remaining surfaces may be any mirrored or reflective material and may be applied to any base material, such as wood, foam, metal, and plastic. Flexible materials such as Mylar® and other sheet materials and films may be used, including the dielectric and thermoplastic polymer of the Fink patent referenced above. Polished stainless steel, glass mirror, bulletproof glass, metalized cloth material such as polyester or duck cloth, tent cloth, sail cloth and the like may be used. The interior should be darker than the exterior and to enhance this, the interior may be painted or coated, for example with a spray-on bed liner or other spray-on material. Insulation, cloth, plastic sheeting or other interior treatments may be used. The roof may be reflective in some applications, such as for a bird blind, but need not be and may be of the same, or different, material than the sides. Ventilation may be provided in the roof, sides, and bottom as needed.

In some embodiments, the entire structure may be of two-way material. In these embodiments, the interior must not be coated or insulated. In these embodiments, a roof or shade is needed to conceal the observer. As is known, the two-way mirror will reveal the interior of the enclosure unless it is darker than the exterior environment. The roof may have two-way ports, and be otherwise reflective, or it may be entirely of two-way material. The roof may slide, fold, or roll, and open and close.

In some embodiments, the individual panels may be completed by covering a frame with an adhesive or tape, such as airframe tape adhesive, and then applying the exterior surface to the frames. Each panel may be permanently affixed to the others at the factory to complete the full enclosure. Alternatively, the individual panels may be transported to the site and put together with temporary or more permanent fixtures such as Velcro, pins, screws, bolts, straps, chains, cables, adjustable ties or shock cords, bungees, as some non-limiting examples. In some applications, the enclosure may be more or less permanently installed, such as a deer blind; in others, it may be freely moved about. The side panels may be of one piece or of multiple interlocking pieces, and may fold, roll or collapse, or remain rigid. Preferably, the exterior reflective material is presented to the onlooker with as few seams or discontinuities as possible.

Figure 4:
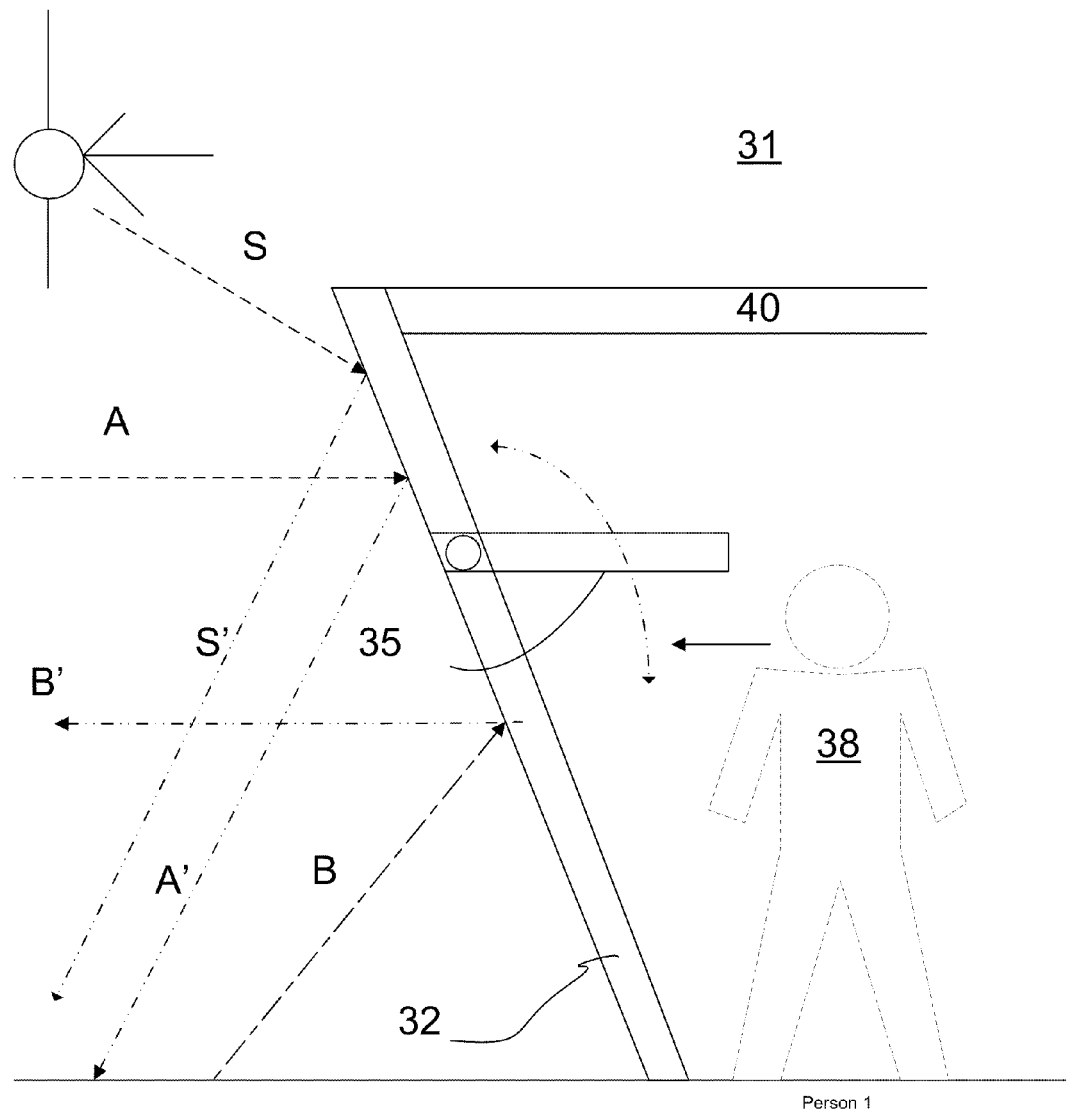
FIG. 4 is a diagram depicting additional details of the embodiments of FIG. 3.

In FIG. 4, some details of the structure 31 are depicted. Roof 40 is provided, although the roof optionally could be eliminated or replaced with netting or other lightweight material. Because the port 35, as is known, is not effective if the area on the observer side is not darkened relative to the reflective or exterior side, use of a roof is preferable to shade the interior. The roof may also provide sun, rain or snow protection and may be sloped to one side where drains may be provided. The roof may be of mirrored material, for example, for use in a bird hunting application, or may be of a darkened wood, plastic, metal, fiberglass or other material. The roof may be of panels that fold, roll, or slide open for example using drawer slides with rollers. The roof may be of a reflective cloth or vinyl material, such as a tenting material to provide waterproof rain protection and shade for the observer, and to make the two-way mirrors effective.

The side 32 is shown inclined towards the horizontal. A moveable two-way mirror is provided. As shown in this non limiting example, the port 35 may flip up. It could also flip down, or slide open and slide closed, roll up, etc. For hunting applications, it will be opened to enable the hunter to take a shot, and should be easy to open and close, and preferably operate more or less silently.

The reflective properties of the enclosure are illustrated in FIG. 4. An onlooker (game or otherwise) would be positioned to the left in the drawing and would not see the reflection of the sun 30, because as shown, a light ray S incident on the exterior of the enclosure 31 is directed downward away from the observer or game. Also, the onlooking observer or game will not see their own reflection, as the horizontal light incident on the enclosure is reflected downward, as shown by incoming ray A and reflected ray A'. The ground covering in the foreground is reflected towards the observer as shown by ray B which is reflected horizontally outwards from the structure as ray B'. Observer 38 can easily see the game and the surroundings using the port 35 which is normally closed.

Figure 5:
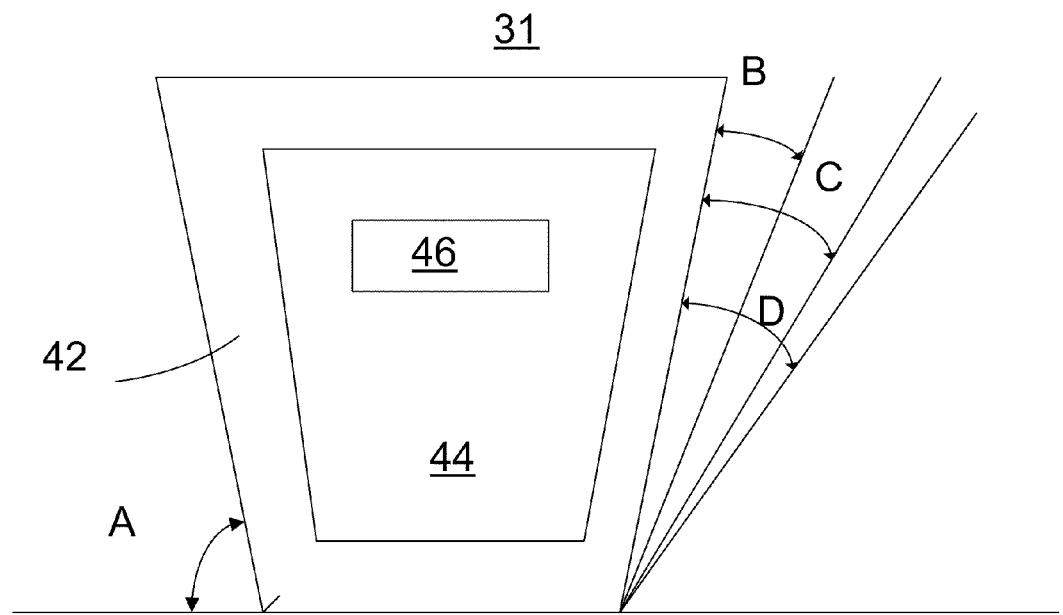
FIG. 5 is a diagram depicting a door embodiment of the enclosure of FIG. 3.

FIG. 5 depicts, in one example embodiment, a door structure for the enclosure 31. The door side 42 of the structure 31 is also preferably reflective, and reflective door 44 is provided with an optional observation port 46. The observation port 46, if used on this side, is of two-way mirror material. The side inclination of the structure is shown in FIG. 5. Angle A may be any angle less than 90 degrees from the horizontal, and may be, for one example 83 degrees. The angle may be greatly varied as shown by example angles B, C, and D; the reflective sides may be quite close to the horizontal and remain effective.

Figure 6:
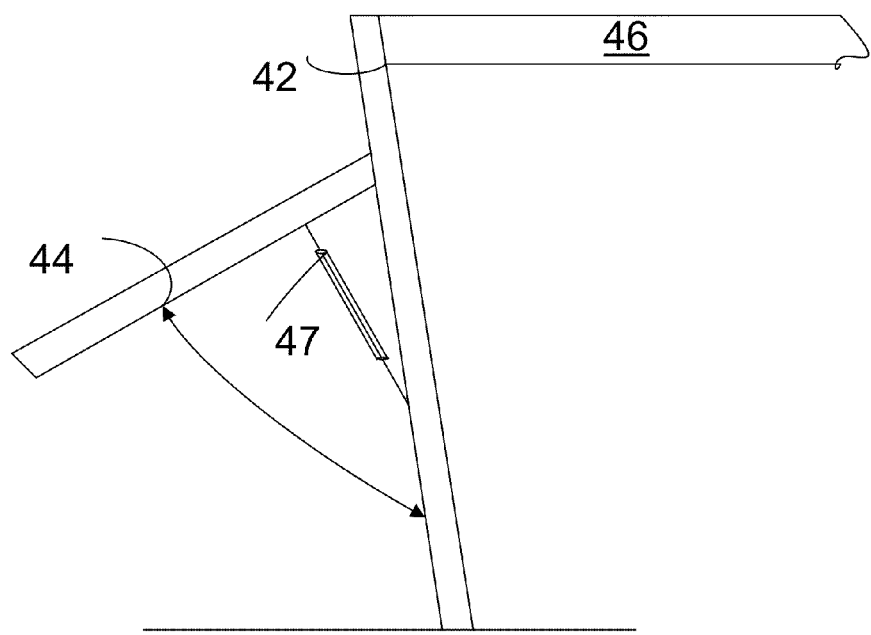
FIG. 6 provides additional details on the embodiment of FIG. 5.

FIG. 6 depicts an example of a door operating system for use with the embodiment of FIG. 5. In FIG. 6, door 44 is shown opening upwards and is supported in this example with a gas filled hydraulic lift 47. This arrangement allows for silent and easy operation of door 44. However, the rear door 44 could alternatively be entirely of flexible material, for example, and could be hinged at the side, bottom or top, or even roll up, slide open or operate as a shade, etc. In this manner, the egress and ingress of the enclosure is provided. Velcro, snaps, or other closure means could be used.

Roof 40 is made of any one of a number of materials that provide shade and protection from the elements. The roof in a deer blind or game observation application may not need to be reflective, as the game cannot see the roof, and may be plastic, wood, canvas, film, Mylar®, etc. In one embodiment, it is a lightweight plastic material cut square to fit the top opening but preferably sloped to provide drainage. Note that the roof may open as described above. Ventilation may be provided in the roof by means of screened or open slots, slits, or round portions. The vents may be closed to provide rain protection. The roof in a bird blind application may be reflective as further described below, and may be flat or dome shaped.

Figure 7:
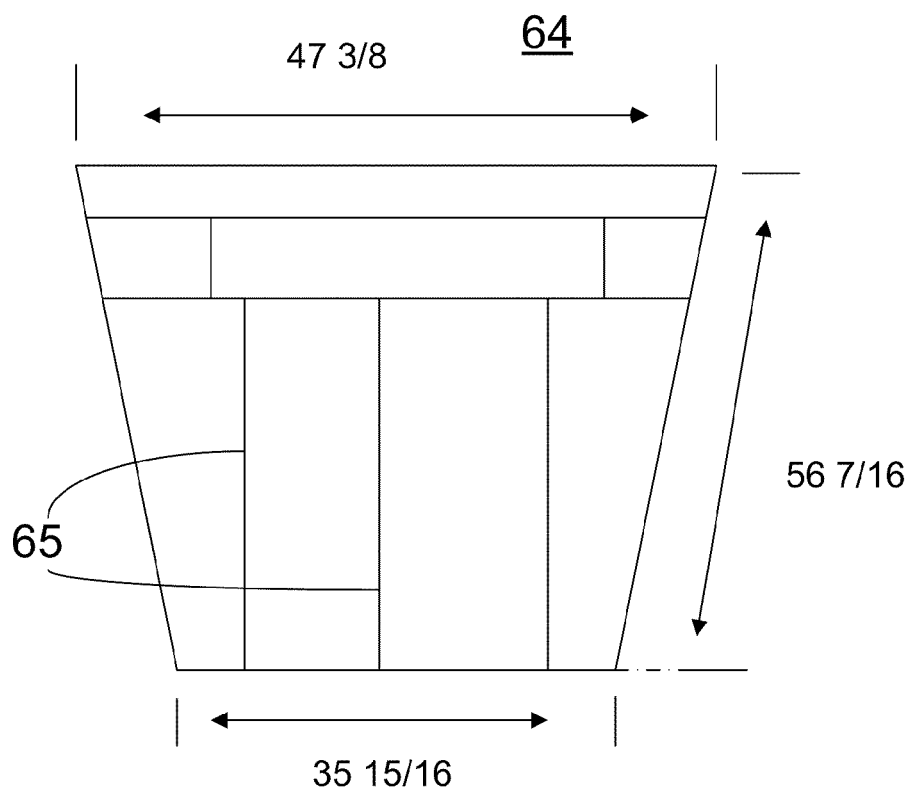
FIG. 7 illustrates one embodiment of a frame structure for use with the invention.

FIG. 7 provides some detail of a first frame 64 for use in forming each side of the enclosures of the above embodiments. For example, the frame 64 may be of ½ inch rectangular tubing such as steel or steel alloy including carbon steel, that may be welded together. Alternatively, other materials such as copper tubing, PVC pipe, iron pipe, angle iron, fiberglass and other framing materials including wood, aluminum and the like could be used. The frame need not be welded together; other attachment methods could be used, and may be provided for disassembly and reassembly using screws, bolts, pins, hinges, cotter keys, pin and pin receiving tubes, for example, as part of the structure. The frame tubing may be square, round, oval in cross section and may be solid, although preferably hollow tubing is used to reduce weight. The frame 64 has various reinforcing components 65 that serve the purpose of adding strength and also the purpose of providing attachment points for the reflective coating material and the two-way mirrored observation port material. The frame is shown in one application example with the dimensions in inches. This illustrative example was used for a deer blind application, however, many other sizes could be used and these dimensions are not limiting and may be larger or smaller. More or fewer frame components could be used.

Figure 8:
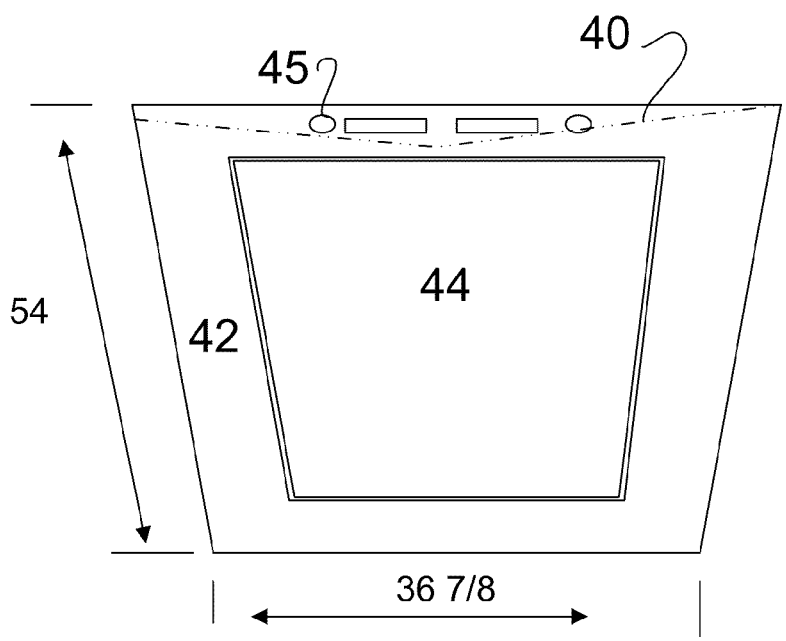
FIG. 8 illustrates additional features that may be used with the invention.

FIG. 8 depicts some additional optional features on a door panel for use with an enclosure. Dimensions are shown in inches for the panel to be mounted, for example, on the frame of FIG. 7. In FIG. 8, rear side 42 is depicted with door 44. Roof 40 is formed of water resistant or waterproof material and as shown, is sloped toward drains or slots 45 placed in the rear side 42. In this manner, the roof 40 can drain and yet remain concealed as it is positioned to be behind the rear and side panels, and out of view of an onlooker. The roof 40 also provides shade, which is needed to effectively provide concealment behind the two-way mirrors. Two-way mirrors that are brightly lit from behind reveal the interior or observer to an onlooker, so the interior must not be lit but remain darker than the exterior for effective concealment of the interior.

Figure 9:
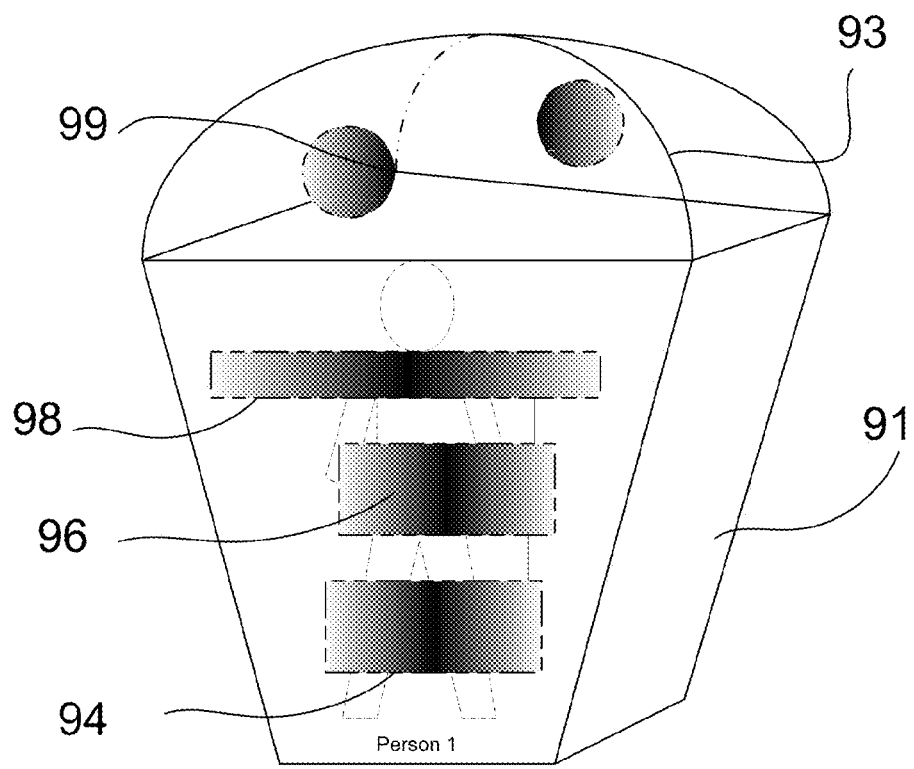
FIG. 9 depicts an additional alternate embodiment enclosure.

The use of a mirrored flexible outer surface, such as a metalized polyester cloth or a film, enables several other embodiments. A "pop-up" enclosure built using flexible metal rods or flexible wires that are contained in pockets formed in the corners of the material, so that the structure is self supporting when expanded by the rods being held under tension, enables the formation of various shaped portable enclosures. FIG. 9 depicts one such enclosure adapted for a duck blind application. In FIG. 9, the enclosure is again a four sided shape 91 but now with a domed roof 93 and a variety of observation ports 94, 96, 98 and 99 made of two-way material, with different shapes and functions. By using pop-up rods as is known in the instant shade or tent art, or by using collapsible tent poles such as fiberglass hollow tubes formed in sections with connectors, a variety of shapes may be used.

Figure 10:
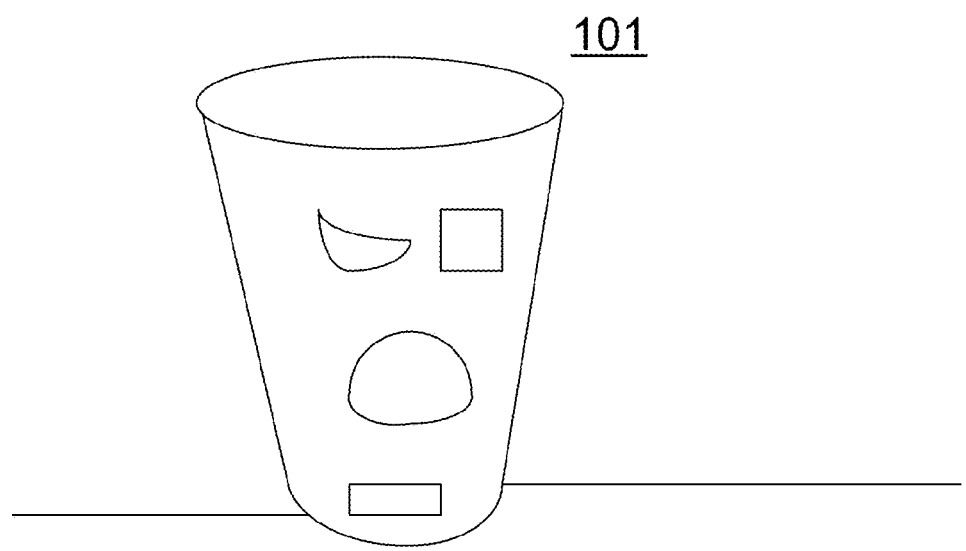
FIG. 10 depicts yet another additional alternative embodiment.

FIG. 10 depicts a round or cone shape 101 that is a "pop-up" or collapsible arrangement with various ports.

Figure 11:
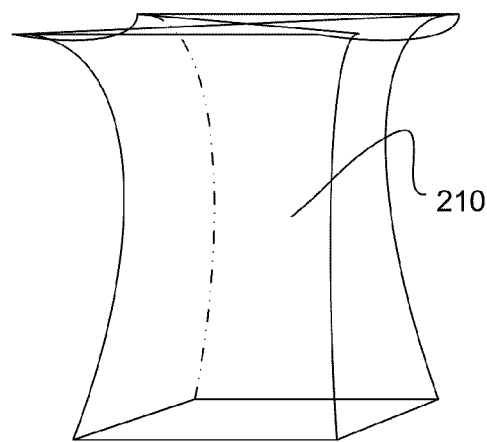
FIG. 11 illustrates another alternative embodiment.
Figure 12:
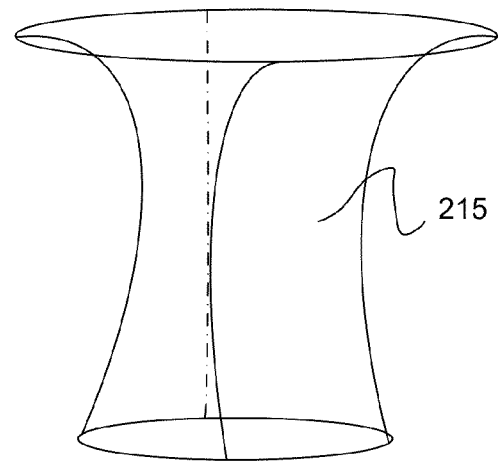
FIG. 12 illustrates another alternative embodiment.

FIGS. 11 and 12 depict additional alternatives. For example, FIG. 11 illustrates a four sided conical shape 210 that is a "pop-up" blind that is inclined towards the horizontal by being widest at the top. FIG. 12 depicts an oval or round pop-up blind 215. The entire exterior could be formed of a two-way reflective material, or if not, two-way mirror observation ports could be provided. A roof is provided to promote the necessary shade and to provide protection from the elements. The roof can be reflective for use as a bird blind. Alternatively, the roof may be netting canvas, or smoked plastic to provide the needed shade for the interior of the enclosure.

Figure 13:
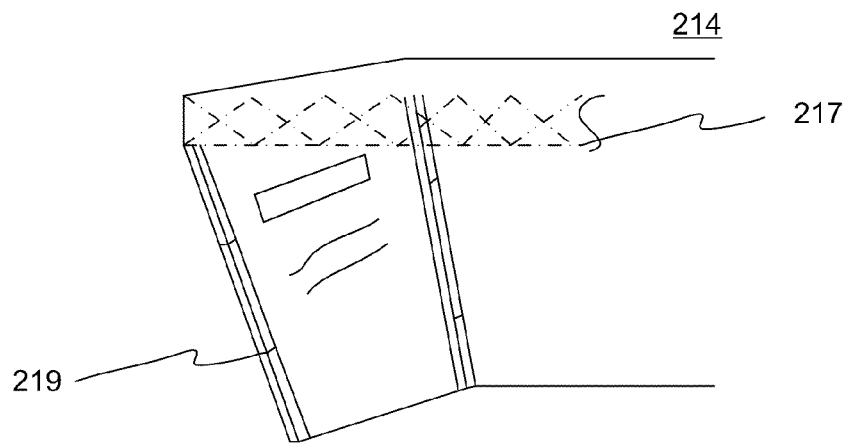
FIG. 13 illustrates another alternative embodiment.

FIG. 13 depicts an alternative embodiment 214 using a collapsible top framing system 217 with collapsible or nesting extensible poles 219 for legs. The scissored top structure 217 allows the corners of the unit to be pushed together and form a small rectangular volume for storage. By using the flexible covering with a mirrored surface, the entire structure can collapse into a suitcase sized carry bag or duffel bag for portability. Alternatively, removable folding panels could be used on the exterior. The enclosure is height adjustable.

Note that any enclosure of the embodiments can be made large enough to provide, in addition to concealment, shelter, storage and living quarters, as the embodiments are not limited in size. For a military application, an enclosure incorporating the concealment may be large enough for a platoon or squadron, or even larger. Size is not limited; the concealment is achieved by use of the reflective material inclined towards the horizontal to reflect the foreground in combination with the two reflective materials, either over the entire structure, or at least over the observation and shooting ports. In addition to use as a hunting blind, the structure may be used as a military or security enclosure and may be used to conceal equipment, vehicles, weapons, ammunition dumps, living quarters and working stations, for example, from visual observers.

Figure 14:
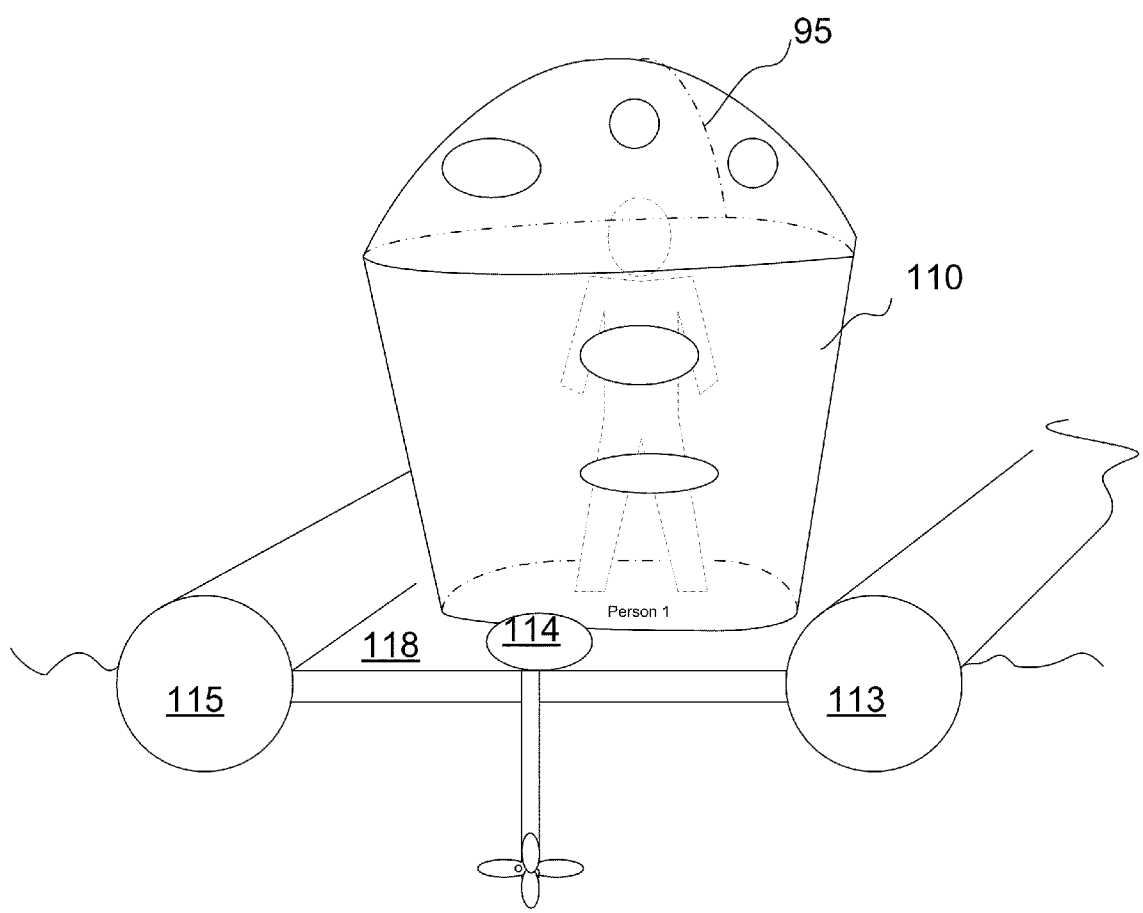
FIG. 14 illustrates an embodiment for an enclosure used on a boat.

FIG. 14 depicts an enclosure 110 adapted for use as a duck blind and mounted on a pontoon boat for example, which may be propelled by an outboard or trolling motor 114, or manually moved with a pole or oar. Pontoons 115 and 113 are shown, with the deck 118 between them. Many variant boat types are used in duck hunting, for example, Jon boats, row boats, canoes and the like. Reflective blinds may be constructed to cover a portion of the boat or the entire boat may be covered with mirrored surfaces so that it is concealed from overflying game birds. In FIG. 14, the roof 95 is reflective and is held up as a dome by flexible rods, fiberglass tent poles, wire rods or the like. Alternatively, the roof 95 may be a flat mirror or mirrors. The roof 95 may be a two-way mirror. Two-way mirrored observation ports are used to both allow the hunter to view the fowl and to shoot through the ports by opening them when needed. Again, the sides are reflective material inclined towards the horizontal, and may be entirely of two-way material, or alternatively, the enclosure may be reflective but have a variety of two-way mirrored observation and shooting ports as shown.

A boat, ship, or even a battleship having slanted sides is particularly suited to the use of the concealment apparatus of the invention. In an embodiment, the slanted hull sides are made reflective and additional reflective material may be extended above the top of the hull to provide additional concealment of people, deck structures, equipment and even weapons. The reflective material may be made bullet proof or armored; and ports covered by two way reflective material can be provided for shooting through, and for observation. The structure may be permanent or a reflective film may be provided on a temporary frame such as a pop-up system. A military or security vessel may be provided with the reflective concealment to allow it to approach a target undetected by visual observation. A reflective top may be provided to further conceal the vessel from airborne observation. Films such as Mylar and the dielectric mirror and thermoplastic polymer of the Fink patent incorporated above may be applied over the existing surfaces, and additional tents or frames supporting reflective material concealing the area above the hull may be extended above the hull. Since the sides of the reflective material are inclined to the horizontal, the reflective material will reflect the surrounding foreground, typically water or shore features, to a visual observer on another vessel or on a shore position, thereby concealing the vessel. By adding reflective material over the top of the vessel, additional concealment may be obtained from airborne observers as well.

Figure 15:
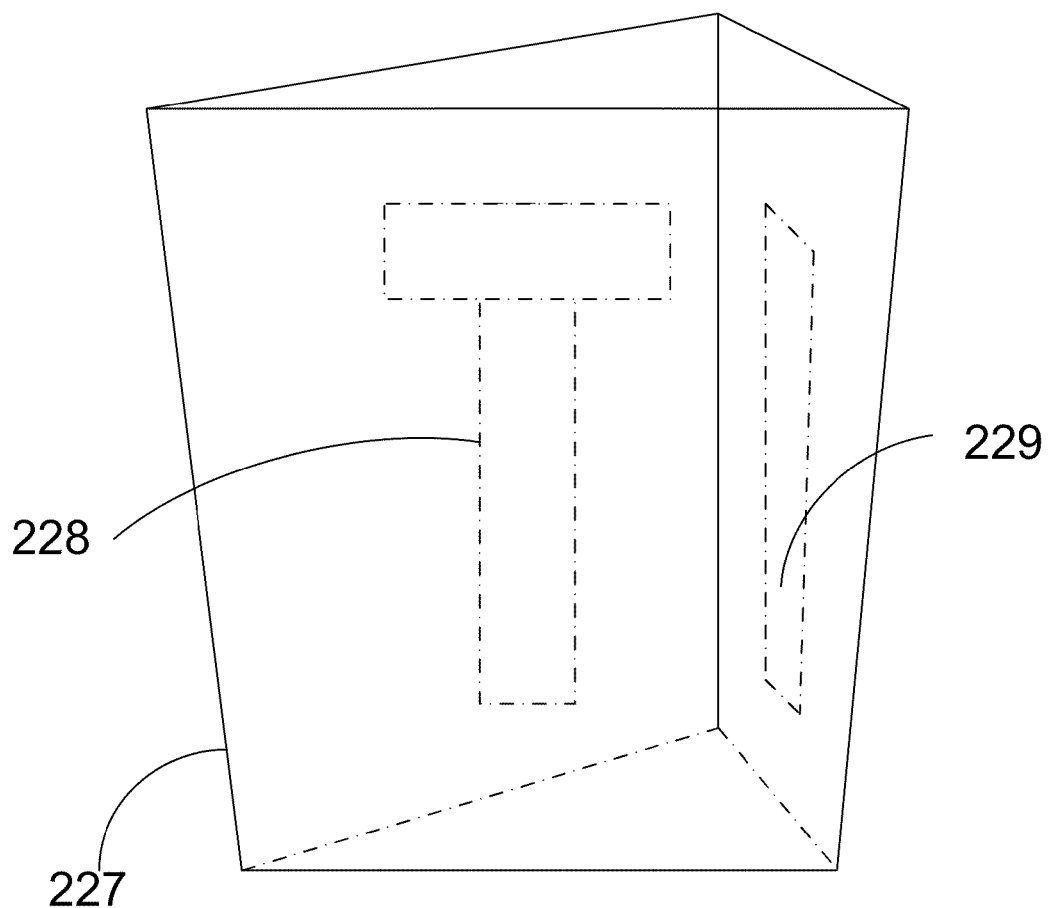
FIG. 15 illustrates an alternative embodiment for a bow hunting enclosure.

FIG. 15 depicts an embodiment particularly constructed for a bow hunting application, although it may also be used for hunting with firearms, or game observation. In FIG. 15, the enclosure 225 is preferably made entirely of two-way mirror material. The ports 228 and 229 are shown for shooting a bow through them when a hunter desires to fire a bow, and the shapes are therefore generally more vertical than horizontal. "T", X" and other port shapes are also available. The enclosure 225 is formed as a triangular shape with the top larger in area than the bottom, so that again the sides 227 are inclined outwardly at the top and tilted towards the horizontal. Many other shapes may also be used, including squares, rectangles, round, oval and polygons such as octagons, pentagons, etc. The bow hunting enclosure can be made from rigid material such as acrylic that is coated on one surface with a two-way coating that is partially reflective to provide the two-way mirror, or of flexible material arranged on folding or collapsible frame supports as described above.

Figure 16:
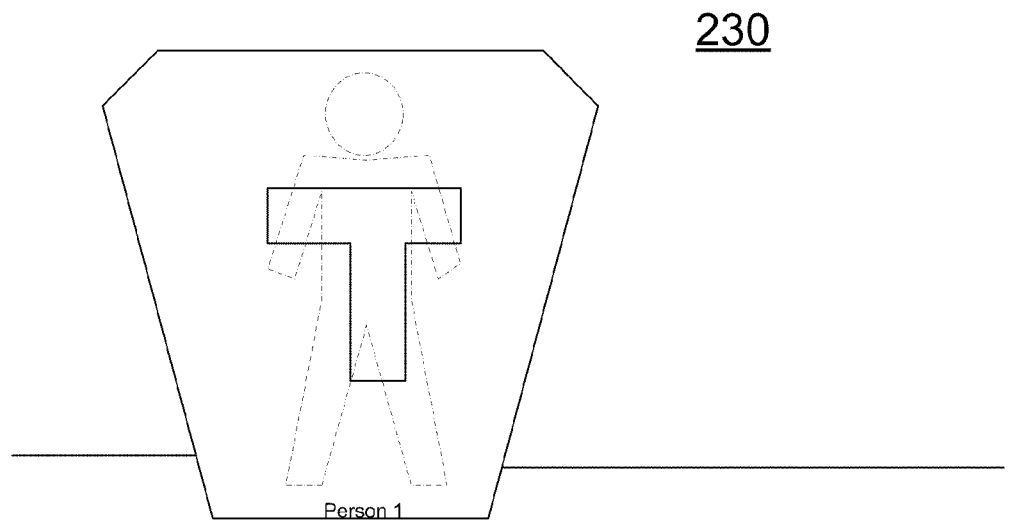
FIG. 16 depicts a portable shield embodiment of the present invention.
Figure 17:
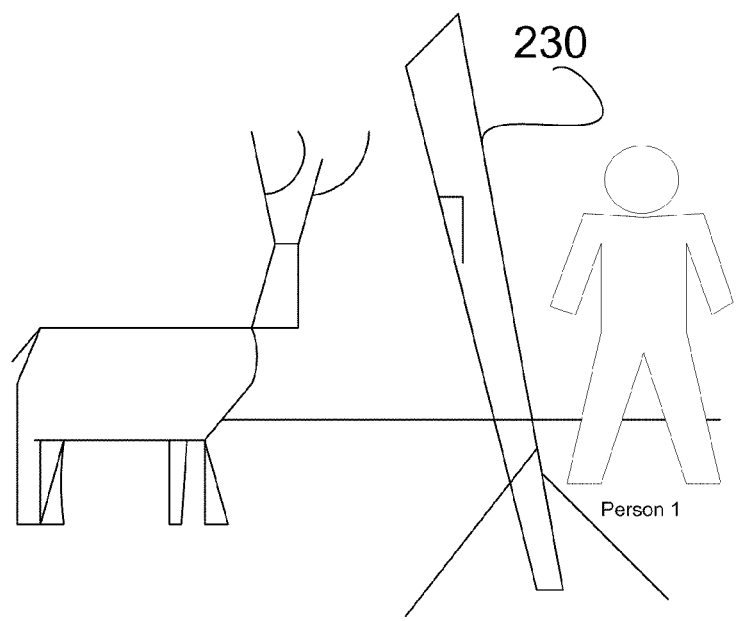
FIG. 17 depicts a side view of the portable shield in a deer hunting application.

In another alternative embodiment, a reflective camouflage is provided as a single person portable shield or panel 230. The panel has a reflective outer surface and two-way ports, and in use, is inclined towards the horizontal so that game or onlooking observers see the foreground reflected towards them, and cannot visually discern the shield, thereby concealing a hunter or observer. In FIG. 16, a bow hunting application is depicted with a T shaped port for the shield. In FIG. 17, a deer hunting application is depicted where the shield 230 has supports that incline the front reflective surface towards the onlooker or game. The observer looks through the two-way material covering the ports. Alternatively, the shield may be formed of two-way material entirely.

Figure 18:
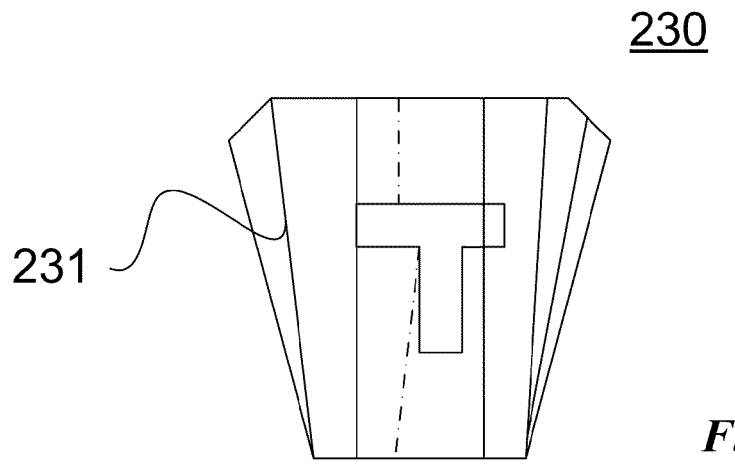
FIG. 18 depicts additional detail of the portable shield.
Figure 19:
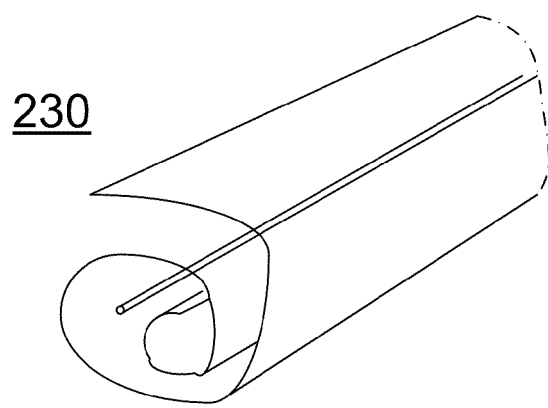
FIG. 19 depicts the portable shield being rolled up for storage.
Figure 20:
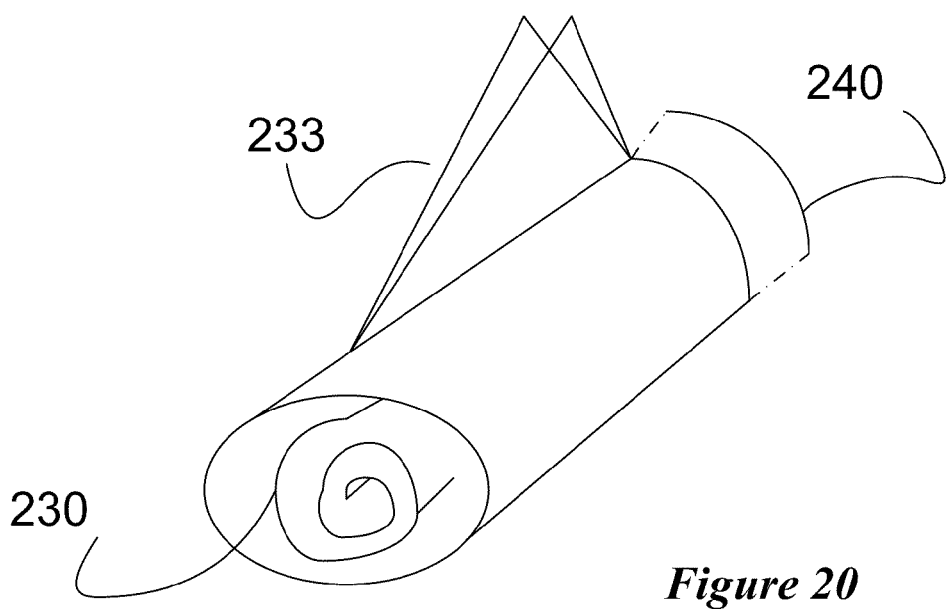
FIG. 20 depicts a carrying case containing the portable shield.

FIG. 18 details how the shield 230 may be formed on a roll up frame, using panels supported by vertical supports 231, or using a flexible covering, for example, mirrored polyester. In FIG. 19, the shield 230 is shown rolled up with the outer covering and the poles or supports rolled together. In FIG. 20, a carrying case 240 such as a hard or soft tube with optional end caps is provided. Case 240 is shown with a strap 233 for containing the shield when it is rolled up. The case could have wheels on the bottom or on one side for ease of use.

Figure 21:
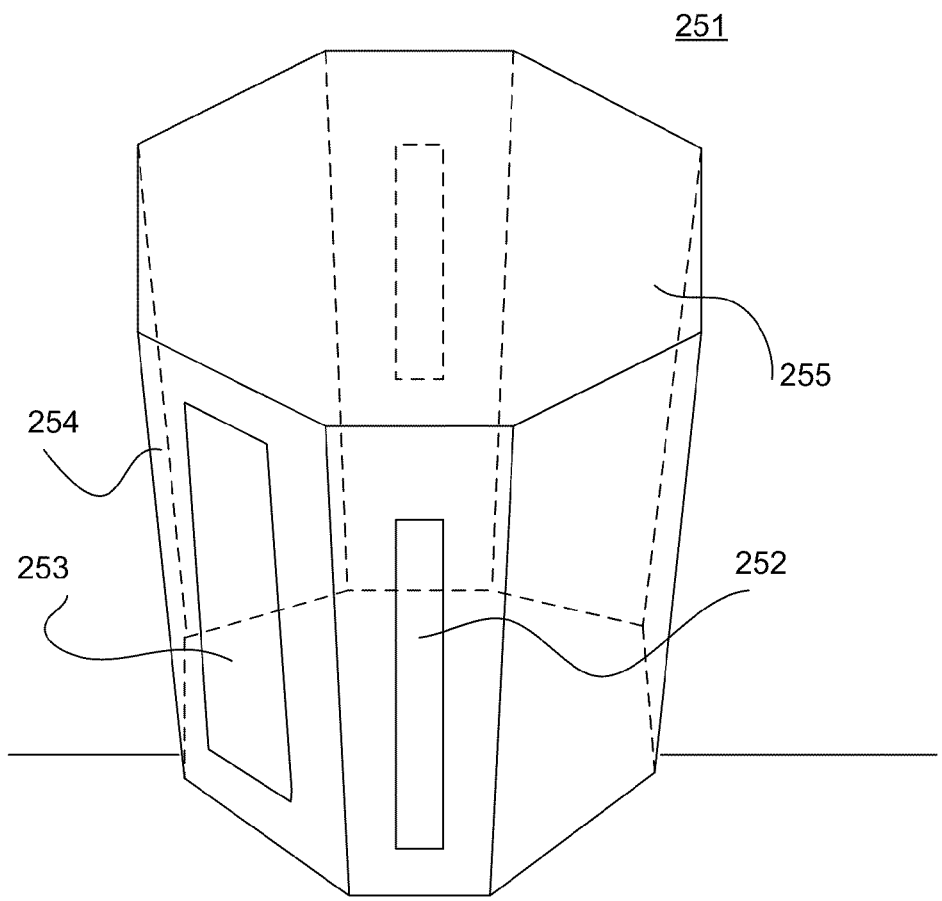
FIG. 21 depicts an octagonal enclosure embodiment.

FIG. 21 depicts another alternative embodiment enclosure. This enclosure is particularly well suited for bow hunting applications but is not so limited, and may be used for any applications where concealing a hunter or observer is desired. In FIG. 21, enclosure 251 is depicted as an octagonal shaped enclosure with each side 254 being reflective and inclining towards the horizontal, that is, the area of the top is greater than the area of the bottom so that the sides tilt outwardly from the center. Of course, any other convenient shape may be used, for instance, hexagons, pentagons, etc. This enclosure may be formed as before of any reflective material, or entirely of two-way mirror material. In one example embodiment, the entire enclosure is formed of Plexiglas® with a partially reflective coating to form a two-way mirrored exterior. Shooting ports 252 are formed and in this application are generally rectangular with the longer side arranged up and down, however many other shapes could be used. One or more doors 253 provide ingress and egress to the enclosure 251. The roof 255 may be reflective, two-way reflective, or of other material such as an opaque or smoked plastic, netting, waterproof fabric, mirror glass, etc. The entire enclosure 251 may be bulletproof mirror glass. If the sides 254 are not two-way mirror material, then the ports 252 will need to be two-way mirrors and thus provide observation areas as well as shooting ports. If the sides 254 are not two-way, the interior should be darkened with paint, a covering or insulator, or spray-on material such as a bed liner material to shade the interior and prevent the onlooker from discerning the hunter through the two-way mirror ports. The octagonal enclosure can be any size, for one, two or more hunters or observers, and may be of a height sufficient to stand, or more or less height may be provided. The enclosure may be a solid, more or less permanent structure, or it may come apart in panels that are semi-permanently assembled with pins, bolts, straps, hinges etc. The structure may be formed to collapse using removable panels or a flexible mirror cloth or film for the exterior.

Figure 22:
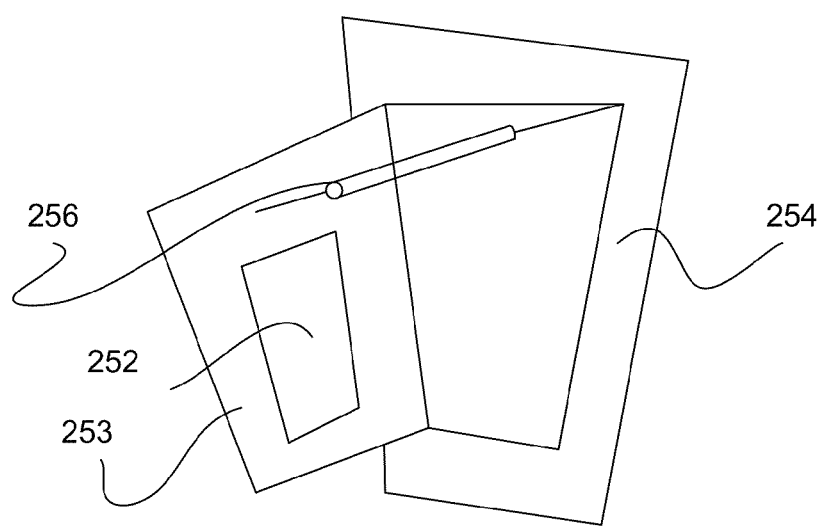
FIG. 22 depicts a door portion of the embodiment of FIG. 21.

FIG. 22 details the operation of door 253 in the enclosure 251. A hinge is provided to enable the door 253 to open from one side. Optionally, a gas shock or lift 256 is provided to facilitate easy opening and quiet operation of the door 253. A shooting port 252 may be incorporated into the door. More than one door may be provided.

Although various embodiments of the present invention and its advantages have been described in detail, it should be understood that various changes, substitutions and alterations can be made herein without departing from the spirit and scope of the invention as defined by any appended claims. For example, many of the materials discussed above can be implemented in different methodologies and replaced by other materials or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, any appended claims are intended to include within their scope such processes, machines, manufacture, compositions of matter, means, methods, or steps.

What is claimed is:

1. An apparatus for concealment, comprising:
   a structure having an interior large enough to conceal at least one observer formed with a reflective outer surface, the reflective outer surface having vertical sides that are inclined towards the horizontal, the reflective outer surface comprising a two way reflective covering;
   supports for the structure that in a first position provide a three dimensional shape to the structure, the supports being held under tension in the first position to provide support to the reflective outer surface;
   one or more ports having a two way reflective covering adapted to movably cover the one or more ports; and
   a roof over the structure that shades the interior of the structure.

2. The apparatus of claim 1, wherein the reflective outer surface further comprises flexible material.

3. The apparatus of claim 2, wherein the flexible material further comprises Mylar.

4. The apparatus of claim 1, wherein the roof comprises a reflective surface.

5. The apparatus of claim 1 wherein the roof comprises a waterproof material and is sloped.

6. The apparatus of claim 5, wherein the roof slopes to one or more drains in the structure.

7. The apparatus of claim 1, and further comprising a door in one of the vertical sides, the door covered entirely with a two way reflective covering.

8. The apparatus of claim 7, wherein the door opens vertically.

9. The apparatus of claim 8, wherein the door is supported by gas struts.

10. A portable apparatus for concealment, comprising:
    an enclosure having an interior large enough to conceal at least one observer that enables rapid deployment by using a collapsible frame to support sides and a roof of the enclosure;
    a reflective outer surface covering the enclosure, the sides of the enclosure configured so that the reflective outer surface has vertical sides that are inclined towards the horizontal;
    one or more ports in the reflective outer surface having a two way reflective covering adapted to movably cover the one or more ports; and
    the roof of the enclosure comprised of material that shades the interior.

11. The portable apparatus of claim 10, wherein the reflective outer surface comprises a flexible film material.

12. The portable apparatus of claim 10, wherein the reflective outer surface comprises a two way reflective covering.

13. The portable apparatus of claim 10, wherein the one or more ports are generally oriented horizontally across the sides of the enclosure.

14. The portable apparatus of claim 10, wherein the one or more ports include a substantial vertical portion.

15. The portable apparatus of claim 14, wherein the one or more ports have a shape selected from the group consisting essentially of a vertical slot, T, and X shape.

16. The portable apparatus of claim 10, wherein the collapsible frame for the enclosure comprises pop-up members held under tension.

17. The portable apparatus of claim 10, wherein the collapsible frame for the enclosure comprises legs that fold or collapse and that support a collapsible top portion having scissored portions on each side of the top portion, the top portion expandable by pulling apart corners at intersections of the sides to lengthen the sides by use of the scissored portions.

18. An apparatus for concealment of a boat, comprising:
    a structure mounted on the boat having an interior large enough to conceal at least one observer formed with a reflective outer surface, the reflective outer surface having vertical sides that are inclined towards the horizontal;
    supports for the structure that in a first position provide a three dimensional shape to the structure, the supports being held under tension in the first position to provide support to the reflective outer surface;
    one or more ports having a two way reflective covering adapted to movably cover the one or more ports; and
    a reflective roof over the structure that shades the interior of the structure.

19. The apparatus of claim 18, wherein the sides of the boat are covered with reflective material.

20. The apparatus of claim 18, wherein the reflective covering is a two way reflective material.

* * * * *